US012625482B2

(12) United States Patent
Spielmann et al.

(10) Patent No.: US 12,625,482 B2
(45) Date of Patent: May 12, 2026

(54) METHOD FOR PERFORMING OPERATOR CONTROL ACTIONS ON AN AUTOMATION FIELD DEVICE BY MEANS OF AN OPERATOR CONTROL UNIT

(71) Applicant: Endress+Hauser Process Solutions AG, Reinach (CH)

(72) Inventors: Benedikt Spielmann, Basel (CH); Werner Thoren, Steinen (DE); Fabricio Oliveira De Andrade, Basel (CH); Yi Ding, Basel (CH)

(73) Assignee: Endress+Hauser Process Solutions AG, Reinach (CH)

(*) Notice: Subject to any disclaimer, the term of this patent is extended or adjusted under 35 U.S.C. 154(b) by 339 days.

(21) Appl. No.: 18/256,490

(22) PCT Filed: Nov. 18, 2021

(86) PCT No.: PCT/EP2021/082181
§ 371 (c)(1),
(2) Date: Jun. 8, 2023

(87) PCT Pub. No.: WO2022/122341
PCT Pub. Date: Jun. 16, 2022

(65) Prior Publication Data
US 2024/0094697 A1 Mar. 21, 2024

(30) Foreign Application Priority Data

Dec. 10, 2020 (DE) .................... 10 2020 132 947.4

(51) Int. Cl.
*G05B 19/042* (2006.01)

(52) U.S. Cl.
CPC ..... *G05B 19/0423* (2013.01); *G05B 19/0428* (2013.01); *G05B 2219/25428* (2013.01)

(58) Field of Classification Search
CPC ............ G05B 19/0423; G05B 19/0428; G05B 2219/25428
See application file for complete search history.

(56) References Cited

U.S. PATENT DOCUMENTS

2007/0255520 A1* 11/2007 Becker ................. G05B 19/042
702/127
2013/0211547 A1* 8/2013 Buchdunger ...... G05B 19/4185
700/11

(Continued)

FOREIGN PATENT DOCUMENTS

DE 102016216921 A1 3/2018
DE 102016119338 A1 4/2018
EP 3296826 A1 3/2018

*Primary Examiner* — Kidest Worku
(74) *Attorney, Agent, or Firm* — Kelly J. Smith; Endress+Hauser (USA) Holding, Inc.

(57) ABSTRACT

Performing operating actions on a field device includes reading out identification information from the field device using an operating unit, selecting a use case by a first operator using the operating unit, (defining an operating action), and accessing the field device and executing the operating action defined in the selected use case. Status information relating to the use case from the operating unit is transmitted to a cloud-based platform, and the status information is confirmed by the first operator or by a second operator. Confirmation information is transmitted by the cloud-based platform to the operating unit via a second communication link. A report is created by the operating unit when confirmation information has been transmitted to the operating unit for each of the operating actions defined in the user case, and the report is linked to a digital image of the field device on the cloud-based platform.

7 Claims, 1 Drawing Sheet

(56)         References Cited

U.S. PATENT DOCUMENTS

2015/0135117  A1       5/2015   Rajappa et al.
2017/0344445  A1 *   11/2017   Vanderah ............... G05B 19/00
2018/0024847  A1       1/2018   Campbell et al.
2018/0210430  A1 *    7/2018   Balduf ............... G05B 19/4186
2019/0332388  A1     10/2019   Schmidt et al.

\* cited by examiner

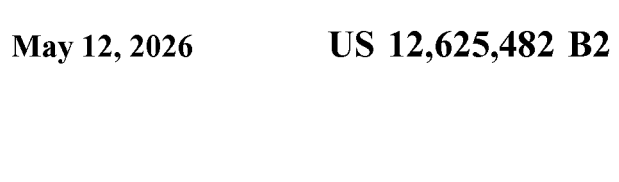

METHOD FOR PERFORMING OPERATOR CONTROL ACTIONS ON AN AUTOMATION FIELD DEVICE BY MEANS OF AN OPERATOR CONTROL UNIT

CROSS-REFERENCE TO RELATED APPLICATIONS

The present application is related to and claims the priority benefit of DPMA Patent Application No. 10 2020 132 947.4, filed on Dec. 10, 2020, and International Patent Application No. PCT/EP2021/082181, filed Nov. 18, 2021, the entire contents of which are incorporated herein by reference.

TECHNICAL FIELD

The invention relates to a method for performing operating actions on a field device of automation technology by means of an operating unit.

BACKGROUND

Field devices that are used in industrial facilities are already known from the prior art. Field devices are often used in process automation engineering, as well as in manufacturing automation engineering. In principle, all devices which are process-oriented and which supply or process process-relevant information are referred to as field devices. Field devices are thus used for detecting and/or influencing process variables. Measuring devices, or sensors, are used for detecting process variables. These are used, for example, for pressure and temperature measurement, conductivity measurement, flow measurement, pH measurement, fill level measurement etc., and detect the corresponding process variables of pressure, temperature, conductivity, pH value, fill level, flow etc. Actuators are used for influencing process variables. These are, for example, pumps or valves that can influence the flow of a fluid in a pipe or the fill level in a tank. In addition to the aforementioned measuring devices and actuators, field devices are also understood to include remote I/Os, radio adapters, or, generally, devices that are arranged at the field level.

A multitude of such field devices is produced and marketed by the Endress+Hauser group.

In modern industrial plants, field devices are usually connected to superordinate units via communication networks such as fieldbuses (Profibus®, Foundation® Fieldbus, HART® etc.). Usually, the superordinate units are control systems or control units, such as e.g. an SPC (stored program control) or a PLC (programmable logic controller). The superordinate units are used for, among other things, process control, process visualization, and process monitoring, as well as commissioning of the field devices. The measured values recorded by the field devices, especially by sensors, are transmitted via the respective bus system to a (or in some cases a plurality of) superordinate unit(s). In addition, data transmission from the superordinate unit via the bus system to the field devices is also required, especially for configuration and parameterization of field devices and for controlling actuators.

To operate the field devices, corresponding operating programs (operating tools) are necessary which either run independently on the superordinate units (Endress+Hauser FieldCare, Pactware, AMS Fisher-Rosemount, PDM Siemens) or else are also integrated into control system applications (Siemens PCS7, ABB Symphony, Emerson Delta V). It is also possible to execute the operating programs on a mobile operating device in order to operate the field devices by means of said operating device. Operating means in particular parameterizing, configuring and reading out data from a field device.

To execute a use case (for example, start up a field device, a loop test—i.e., a test of the correct functioning of the communication current loop connected to the field device—service a field device, replace an old device with a new device, a firmware update of a field device, etc.), a large number of operator actions must be performed by the operator. By way of example, the problems in performing a loop test on a field device is described below:

During start-up, an operator must connect to each field device to be commissioned and its device drivers via an operating unit (for example a device configuration tool like the Field Xpert produced and sold by the applicant) (for example via a frame application executed on the operating unit, in particular an FDT frame application).

Within this device driver (for example a DTM if used as a FDT frame application), the operator selects the function of the loop test. However, the correct function of the loop test is often placed differently in drivers of different field device types. Finding the correct function within the device driver can prove time-consuming.

The exact operating actions that use different types of communication in field devices, also differ:

With a field device which uses the classic 4 to 20 mA standard, various mA values must be tested, for example 4 mA, 8 mA, 16 mA, 20 mA). With a field device, however, which is connected to a fieldbus, the measuring range for the outputs must be simulated (e.g. at 50%). The loop test itself is therefore very time-consuming and prone to errors. Different tools/media must also be carried for different device types.

During the loop test, feedback from the control center is required, e. g., via a mobile phone or radio to confirm various steps, or to enter the results into the corresponding process control systems. In this case, misunderstandings or unreliable feedback can lead to a risk.

After a successful loop test, a report must also be created manually.

The invention is therefore based on the object of presenting a method which permits the simplified and fully integrated execution of operating functions on a field device of automation technology.

SUMMARY

The object is achieved by a method for performing operating actions on a field device of automation technology by means of an operating unit, comprising:
  a) establishing a first communication link between the operating unit and the field device;
  b) reading out field device identification information from the field device by means of the operating unit;
  c) establishing a second communication link between the operating unit and a cloud-based platform, in particular via the Internet or a local network, wherein digital images of a plurality of field devices are stored on the cloud-based platform, said digital images containing at least a portion of all the parameter and configuration settings of all the associated field devices;
  d) selecting a use case by a first operator by means of the operating unit, wherein a use case defines at least one or more operating actions to be performed on the field device;

e) accessing the field device via the first communication link and executing the operating action defined in the selected use case;

f) transmitting status information relating to the use case from the operating unit to the cloud-based platform via the second communication link, wherein the status information contains the operating action carried out on the field device and the result thereof;

g) confirming the status information by the first operator or by a second operator on an application executed on the cloud-based platform, and transmitting confirmation information after confirmation by the cloud-based platform to the operating unit via the second communication connection link;

h) repeating method steps e) to g) for each of the operating actions defined in the use case;

i) creating a report by the operation unit when confirmation information has been transmitted to the operating unit for each of the operating actions defined in the use case, and transmitting the report from the operating unit to the cloud-based platform via the second communication link, wherein the report contains at least one description or a designation of the performed operating actions; and j) identifying the digital image belonging to the field device on the basis of the identification information and linking the report to the digital image of the field device.

The method according to the invention enables a harmonized, automated and fully integrated execution of use cases relating to a field device. The actions to be performed by an operator are reduced to a minimum.

Field devices that are cited in connection with the method according to the invention are already listed as examples in the introductory part of the description.

A "cloud-based platform" refers to a server which can be contacted for an operator via the Internet and on which one or more applications are executed which enables a display, processing and management of data of the assets of a system.

According to an advantageous embodiment of the method according to the invention, it is provided that the operating action is one of the following:

an automatic function check of at least one hardware component of the field device;

a function check of communication capability of the field device, in particular relating to a communication loop connected to the field device, or a communication network into which the field device is integrated;

an automatic determination or changing of at least one parameter value of the field device.

A use case typically consists of a plurality of operating actions to be performed. It is provided that the majority of these operating actions are performed automatically, i.e. without any intervention by the operator. How the operating actions are to be performed and which components of a field device have to be addressed in which way by the operating unit is defined in a operating program executed on the operating unit.

According to an advantageous development of the method according to the invention, provision is made for a configuration assistant to be executed on the operating unit, said configuration assistant offering the user cases available for the field device to the first operator, wherein the configuration assistant determines the available use cases based on the identification information read out from the field device. Use cases for the field device type and field device configuration differ, as do the operating actions defined in a use case. For example, a loop test is different for different communication types in the types of operation actions. Various available use cases are stored in the operating unit or on the operating unit. Alternatively, it can be provided that the operating unit transmits the read-out identification information to the cloud-based platform, and the cloud-based platform transmits the use case available for the field device and the operating actions defined therein to the operating unit. Program code for executing the respective operating actions can also be transmitted from the cloud-based platform to the operating unit via the second communication channel.

According to an advantageous embodiment of the method according to the invention, it is provided that the configuration assistant guides the operator through the step of performing the operating action in that the configuration assistant specifies and/or explains actions to be carried out by the operator. Most operating actions defined in a use case are carried out automatically by the operating unit, i.e. independently. Partly, however, (mechanical) actions of the operator must be performed, for example, using tools, connecting devices, cables, etc. The operator receives an instruction for correct execution, thereby minimizing errors.

According to an advantageous embodiment of the method according to the invention, it is provided that the application of the cloud-based platform creates a new virtual image if no digital image belonging to the field device can be determined on the basis of the identification information. This eliminates another manual step if a field device is newly commissioned, for example.

According to an advantageous embodiment of the method according to the invention, it is provided that a tablet, a mobile terminal, a personal computer, or data glasses are used as the operating unit. For this purpose, an application program is executed on the operating unit, which includes the functionalities required for executing the operating actions. Depending on the type of the employed operating unit, the application program can be a frame application (for example, an FDT frame application) with the corresponding device drivers (for example DTM, etc.) or an app (for example like the app "SmartBlue" published by Endress+ Hauser).

According to an advantageous embodiment of the method according to the invention, it is provided that the report contains the date and/or the time at which the operating action was performed, the identity of the first operator, and/or the identity of the second operator. This ensures traceability with regard to the use case and increases transparency.

BRIEF DESCRIPTION OF THE DRAWINGS

The invention is explained in greater detail with reference to the following FIGURE. Illustrated are:

FIG. 1 shows an exemplary embodiment of the method according to the present disclosure.

DETAILED DESCRIPTION

A plurality of field devices FG2, FG2, FG3 are to be commissioned in a new part of an automation technology plant. The FG1, FG2, F3 field devices are flowmeters based on the Coriolis principle. However, the method according to the invention is not limited to specific field device types or field devices of specific manufacturers.

For startup, a first operator BN1 connects to the field device FG2 in process step a) with an operating unit BE to establish a first communication link. In the present case, the operating unit BE is an industrial table which has an app for operating the field device FG2. However, other types of operating units, for example laptops, additional mobile terminals, etc., can also be used. In the present case, the communication link is wired, for example via a service interface of the field device FG2. Alternatively, the first communication link can also be wireless, for example using the Bluetooth standard.

In a method step b), the operating unit BE reads identification information IF of the field device FG2. The identification information IF serves for the unambiguous identification of the field device FG2 and contains, for example, the serial number of the field device FG, the TAG of the field device FG2, the device type of the field device FG and/or the field device type of the field device FG2.

In a method step c), the operating unit BE establishes a second communication link to a cloud-based platform CP via the Internet, for example via a mobile connection.

In a method step d), the operating unit BE provides the first operator BN1 with a plurality of possible use cases UC for operating the field device FG2. Each of the use cases UC contains at least one operating action to be executed on the field device FG2. The operating unit BE identifies the use cases UC available for the field device FG2 on the basis of the identification information IF read out from the field device FG2. Alternatively, the operating unit BE transmits the identification information IF to the cloud-based platform CP which transmits the available use cases UC to the operating unit BE.

The first operator BE then selects one of the use cases UC. In the present case, the first operator selects as the use case UC a loop test of the communication link of the field device FG, which is part of the commissioning. It can also be provided that the first operator BN1 selects a "Commissioning" use case UC which contains the loop test. The loop test contains a plurality of operating actions, for example the simulation of a plurality of output process values, wherein the field device FG outputs the corresponding value (for example in mA) via the communication loop.

In a method step e), the first of the operating actions defined in the use case UC is executed on the field device FG. For this purpose, the operating unit BE accesses the field device FG via the first communication link. The operating unit BE performs this operating action substantially automatically. In the event that an action is needed from the first operator BN1, he is accordingly informed. Optionally, the operating unit BE1 presents the steps to be carried out for this purpose to the first operator BN1, in particular by means of a wizard.

After completion of the first operating action, in method step f), the operating unit BE creates status information ST on the use case (for example "first operating action successfully completed") and transmits this status information ST to the cloud-based platform CP via the second communication link. A second operator BN2, for example the plant operator, then checks for example the output value of the field device FG in the control center for correctness and confirms the status information ST in the cloud-based platform CP if correct.

After confirmation, the cloud-based platform CP generates confirmation information BS in a method step g) and transmits this confirmation information BS to the operating unit BE via the second communication link.

Only after the confirmation information BE has been successfully received does the operating unit BE continue with process step h). Here, it is checked whether further operating actions are defined in the use case UC, for example the simulation of a process value of a different size. If this is not the case, method step i) continues. If this is the case, however, process steps e) to g) are repeated until all operator actions have been performed and confirmation information is available for all operator actions defined in the use case UC.

Subsequently in a method step i), the operating unit BE creates a report BR on the executed use case UC. The report BR contains all operator actions performed on the field device FG, the associated time stamp, and the identification such as the name of the first and the second operator BN1, BN2. The report is then transmitted to the cloud-based platform CP, stored thereon, and assigned in particular to a digital image or digital twin of the field device FG2.

The method according to the invention makes it possible to conveniently perform use cases UC on a field device FG1, FG2, FG3. The operating unit BE automatically executes nearly all operating actions. This solution is fully integrated since the operator does not require any further tools or software programs besides the operating unit BE.

The invention claimed is:

1. A method for performing operating actions on a field device of automation technology using an operating unit, comprising:

establishing a first communication link between the operating unit and the field device;

reading out field device identification information from the field device using the operating unit via the first communication connection;

establishing a second communication connection between the operating unit and a cloud-based platform, wherein digital images of a plurality of field devices are stored on the cloud-based platform, said digital images containing at least a portion of all parameter and configuration settings of the respective associated field devices;

selecting a use case by a first operator using the operating unit, wherein a use case defines at least one or more operating actions to be performed on the field device;

accessing the field device via the first communication link and executing the operating action defined in the selected use case;

transmitting status information relating to the use case from the operating unit to the cloud-based platform via the second communication link, wherein the status information contains the operating action carried out on the field device and the result thereof;

confirming the status information by the first operator or by a second operator on an application executed on the cloud-based platform, and transmitting confirmation information after confirmation by the cloud-based platform to the operating unit via the second communication connection;

repeating the above method steps for each of the operating actions defined in the use case;

creating a report by the operating unit when confirmation information has been transmitted to the operating unit for each of the operating actions defined in the user case, and transmitting the report from the operating unit to the cloud-based platform via the second communication link, wherein the report contains at least one description or a designation of the performed operating actions; and identifying the digital image belonging to the field device on the basis of the identification information and linking the report to the digital image of the field device.

2. The method according to claim 1, wherein the action instruction is one of the following:

an automatic function check of at least one hardware component of the field device;

a function check of communication capability of the field device;

a communication network into which the field device is integrated; or an automatic determination or changing of at least one parameter value of the field device.

3. The method according to claim 1, wherein a configuration assistant is executed on the operating unit, said configuration assistant offering the user cases available for the field device to the first operator, wherein the configuration assistant determines the available use cases on the basis of the identification information read out from the field device.

4. The method according to claim 3, wherein the configuration assistant guides the first operator through the step of performing the operating action in that the configuration assistant specifies and/or explains actions to be carried out by the first operator.

5. The method according to claim 1, wherein the application of the cloud-based platform creates a new virtual image if no digital image belonging to the field device can be determined on the basis of the identification information.

6. The method according to claim 1, wherein a tablet, a mobile terminal, a personal computer or smart glasses are used as the operating unit.

7. The method according to claim 1, wherein the report contains the date and/or the time at which the operating action was performed, the identity of the first operator and/or the identity of the second operator.

* * * * *